3,300,358
FABRICATING DECORATIVE ARTICLES
Amedee Jean Fournier, 10 Rue Rosa Bonheur,
Paris, France
Filed Jan. 17, 1966, Ser. No. 523,837
2 Claims. (Cl. 156—219)

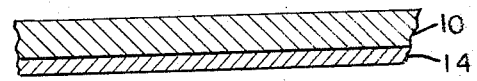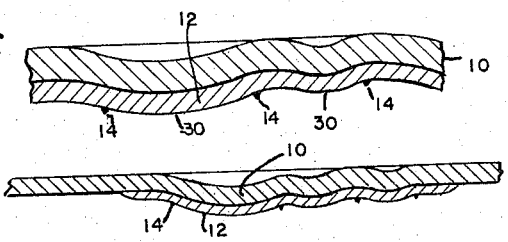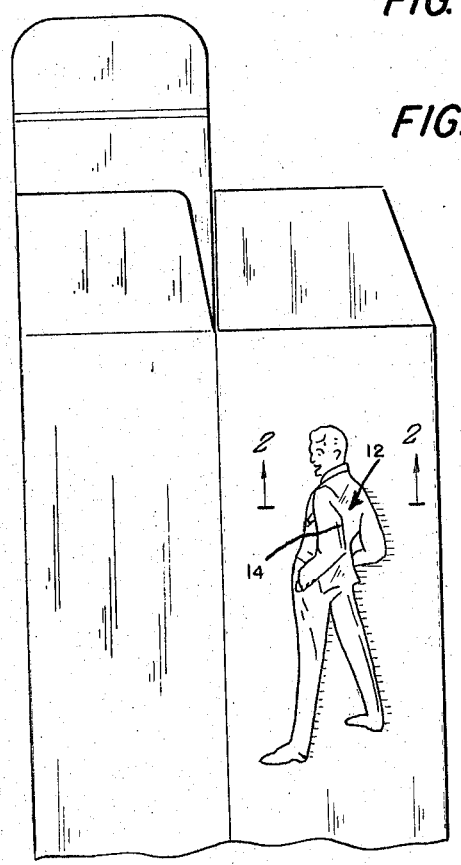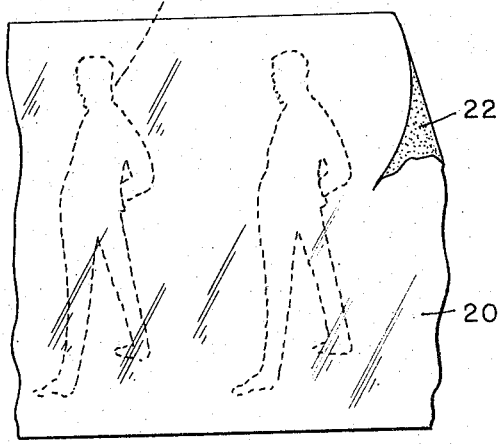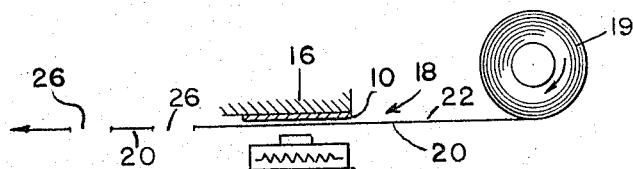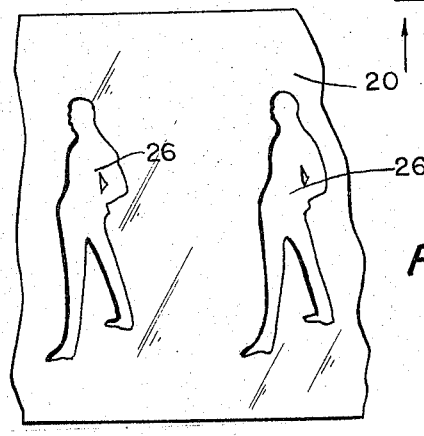

This invention relates to a process of fabricating decorative articles such as boxes, cartons, wrappers, display posters, catalogs, books, various types of advertising material and the like, and is a continuation-in-part of the application of Amedee Jean Fournier, Serial No. 312,470, filed September 30, 1963, for "Process for Manufacturing Cardboard Articles With Appropriate Machinery for Working Up This Process and Articles Similar to Those Obtained by Application of the Present or Similar Process."

The primary object of the present invention resides in the provision of a novel process of fabricating decorative articles in a simple manner susceptible for use in extremely rapid mass production, and which includes the novel concept of simultaneously die cutting a figure from an elongated strip of material and providing an impression on a base, while also laminating by heat and pressure the figure to the base. The invention is further carried out by embossing the base and figure to define raised portions for providing a three-dimensional configuration for the embossed figure. Thereafter, there is printed on the embossed figure suitable indicia, preferably printing, to further emphasize the raised portions.

A further object of the invention resides in the provision of a process for fabricating a decorative article that gives a realistic three-dimensional appearance to the decoration.

An additional object of the invention is to produce a decorative article which has a natural three-dimensional and highly attractive appearance and which may have a rich satin or silky look due to the fact that satin, silk, nylon, paper, velvet, velour, and like materials are adapted to be utilized in conjunction therewith.

A further object of the present invention resides in the provision of a process of forming a decorative article which may be utilized to produce highly attractive boxes and containers for various articles, such as cosmetics, drugs, household necessities, clothing and the like.

Still further objects and features of the present invention reside in the provision of a process of fabricating decorative articles that gives rise to new and unique concepts in the packaging and advertising art, which provides a distinctively three-dimensional flavor to the decorative figures, and which process can be carried out by conventionally existing machinery, so as to enable the utilization of the process without requiring excessive initial expense.

These, together with the various ancillary objects and features of this invention, which will become apparent as the following description proceeds, are attained by this process of fabricating a decorative article and the decorative article, as illustrated in the accompanying drawing, by way of example only, wherein:

FIG. 1 is an elevational view of a portion of a box utilizing the concepts of the present invention;

FIG. 2 is an enlarged transverse sectional detail view taken along the plane of line 2—2 in FIG. 1;

FIG. 3 is an elevational view of a portion of an elongated strip of material from which the figure of the present invention is adapted to be die cut;

FIG. 4 is a schematic diagram utilized for illustrating one of the steps in the process of the present invention;

FIG. 5 is a sectional detail view in a greatly enlarged scale, showing the construction of the laminated figure on the base;

FIG. 6 is a sectional detail view in a greatly enlarged scale, similar to FIG. 5, but showing the decorative article after it has been embossed, and after it has been printed thereon; and, FIG. 7 is an elevational view of a portion of the strip material after figures have been die cut therefrom.

With continuing reference to the accompanying drawing wherein like reference numerals designate similar parts throughout the various views, reference numeral 10 is used to generally designate a box or like article, such as a carton, display poster, catalog, book, advertising sheet, on which the process of fabricating a decorative article in accordance with the concept of the present invention is to be utilized. The base 10 forming the box is preferably made of cardboard, paperboard or like material, and embossed thereon is a figure 12, which has additional printing 14 thereon, preferably attained from a carbon strip material so as to give a natural three-dimensional appearance and effect to the figure 12.

In carrying out the invention, the cardboard of which the box 10 is formed is passed along a backing plate 16, see FIG. 4. In conjunction with the feeding of the base 10 in the direction indicated by arrow 18, there is passed from a paper roll 19 an elongated strip 20. The strip material 20 has a coating on the surface 22 thereof or suitable size for adhesive. The strip 20 is passed immediately adjacent the base 10 and the backing plate 16 and in conjunction with the backing plate a heated die 24 is pressed against the strip 20 and the base 10 cutting out the strip 20 the figure 12, and leaving a die cut opening or hole 26 in the elongated strip 20. The application of pressure of die cutting and the heat from the heated die, which is at temperatures ranging from 230° F. to 270° F., will be sufficient to bond the sizing 22 on the figure 12 to the base 10. Of course, successive die cutting operations will cut successive holes 26 in the elongated strip material 20. The material 20 may be selected from such as paper or other paper-like material, velvet, silk, either natural or synthetic, satin, velour or the like, so as to provide a highly attractive and novel effect.

Thereafter, the base 10 with the figure 12 laminated thereto, as shown in FIG. 5 is passed through an embossing stage wherein the base 10 and the figure 12 are embossed to provide the raised portions such as are indicated at 30 on said figure 12. Thereafter the embossed figure 12 is passed to a location where the embossed figure is die printed utilizing preferably strip material such as a carbon impregnated sheet to provide printing 14 shown as raised printing on the figure 12 at locations for emphasizing the raised portions 30.

Thus, it can be seen that there has been defined a process of fabricating a decorative article which comprises the steps of positioning an elongated strip of material having a coating of adhesive on one side thereof adjacent a base sheet. Then, simultaneously a figure is cut in the strip with a heated die and the figure is laminated into the sheet while an impression is formed on the sheet through the application and heat and pressure.

Thereafter, the sheet with the figure thereon is embossed to give it a three-dimensional configuration and printing thereafter is achieved to further emphasize the three-dimensional configuration.

It is to be understood that simultaneously with the die cutting of the figure 12, the figure 12 and base 10 can be embossed utilizing a combination cutting and embossing die.

A latitude of modification, substitution and change is intended in the foregoing disclosure, and in some instances, some features of the present invention will be employed without a corresponding use of other features. Accordingly, it is appropriate that the appended claims be construed broadly and in a manner consistent with the spirit and scope of the invention herein.

I claim:

1. A process of fabricating a decorative article comprising the steps of positioning an elongated strip of material having a coating of sizing on one side thereof adjacent a base sheet, simultaneously cutting a figure out of said strip with a heated die and applying said cutout figure with the sizing on said figure contacting said base sheet and applying thereafter heat at a range of temperature from 230 degrees Fahrenheit to 270 degrees Fahrenheit and pressure on said figure and said base sheet to make an impression on said sheet and to laminate said figure on said sheet, thereafter applying pressure from the underside of both said sheet and figure to emboss said sheet and figure from the underside thereof to define raised portions and thus provide a three-dimensional configuration for said embossed figure, and then die printing on said embossed figure with carbon impregnated sheets along said raised portions to form raised printed portions to further emphasize said raised portions.

2. A process according to claim 1, wherein said sheet is formed of cardboard and said strip is formed of paper.

References Cited by the Examiner

UNITED STATES PATENTS

| | | | |
|---|---|---|---|
| 2,043,809 | 6/1936 | Papp | 156—220 X |
| 2,184,121 | 12/1939 | Henriksen | 156—224 X |
| 2,307,909 | 1/1943 | Avery | 156—209 |
| 2,912,748 | 11/1959 | Gray | 156—220 X |
| 3,179,551 | 4/1965 | Dudas | 156—219 |

EARL M. BERGERT, *Primary Examiner.*

MORRIS SUSSMAN, *Examiner.*